United States Patent [19]

Foot et al.

[11] Patent Number: 4,579,724
[45] Date of Patent: Apr. 1, 1986

[54] CATHODE MATERIAL FOR ALKALI-METAL RECHARGEABLE CELL

[75] Inventors: Peter J. S. Foot; Brian A. Nevett, both of Brighton, England

[73] Assignee: National Research Development Corporation, London, England

[21] Appl. No.: 638,398

[22] PCT Filed: Dec. 6, 1983

[86] PCT No.: PCT/GB83/00319
§ 371 Date: Aug. 6, 1984
§ 102(e) Date: Aug. 6, 1984

[87] PCT Pub. No.: WO84/02333
PCT Pub. Date: Jun. 21, 1984

[30] Foreign Application Priority Data

Dec. 6, 1982 [GB] United Kingdom ............... 8234749

[51] Int. Cl.$^4$ ............................................. C01B 25/14
[52] U.S. Cl. .................................. 423/303; 429/194; 429/218; 429/221; 429/223
[58] Field of Search ........................................ 423/303

[56] References Cited

U.S. PATENT DOCUMENTS 4,267,157  5/1981  Maas et al. ..................... 423/303
4,439,301  3/1984  Reichman et al. ............... 423/303

*Primary Examiner*—John Doll
*Assistant Examiner*—Wayne A. Langel
*Attorney, Agent, or Firm*—Oblon, Fisher, Spivak, McClelland & Maier

[57] ABSTRACT

A low-temperature synthesis of $M^{II}PS_3$ (M preferably Fe, Co or Ni) comprises mixing $M^{2+}$ cation with $P_2S_6^{4-}$ anion; if insoluble, $M^{II}PS_3$ precipitates; otherwise, $M^{2+}$ cation can be supplied off an $M^{2+}$-cation-exchange resin through which $Na_4P_2S_6$ solution is trickled. The product is X-ray amorphous, and is brought to a desirable degree of partial order by heating at 350° C. for 3 hours. In this form it can reversibly intercalate lithium and, mixed with binder and graphite, is a cathode for a lithium rechargeable cell.

11 Claims, No Drawings

CATHODE MATERIAL FOR ALKALI-METAL RECHARGEABLE CELL

This invention relates to a cathode material for an alkali-metal rechargeable cell, and to a method of preparing the material. There is a need for cells storing as much electricity as possible per unit weight or volume. Some of the most promising systems use alkali-metals, especially lithium, as the anode active material which is transferred to the cathode as discharge and returns to the anode on recharge. While many substances could serve as cathode materials for such cells, certain divalent metal phosphorus trisulphides ($M^{II}PS_3$) have the combined advantages of high capacity and rechargeable operation. The nickel and iron compounds $NiPS_3$ and $FePS_3$ in particular show desirable battery characteristics, because of the nature of their cell reactions which involve reversible insertion or intercalation of alkali metal ions from the anode into the crystal lattice of the cathode.

Compounds $M^{II}PS_3$ can be synthesised by direct reaction of the pure elements at 600° to 800° C. but this is costly in energy and leads to crystals which, we find, do not show the best performance. This high-temperature direct synthesis is totally unsuited for large-scale production.

The present invention provides a lower-temperature method (e.g. 0° to 100° C.) of making $M^{II}PS_3$ compounds in a somewhat amorphous (i.e. microcrystalline or partially ordered) form which is particularly well-suited to their use in cathode fabrication and also offers improved battery behaviour.

Thus, according to the invention, a method of preparing the compound $M^{II}PS_3$ (empirical formula), where M is a metal, comprises bringing together a source of hexathiohypophosphate anion and a solution of $M^{2+}$ cation, whereby the compound $M^{II}PS_3$ is formed, and heating the $M^{II}PS_3$ in a non-reactive environment for 1 to 6 hours at 150° to 500° C.

The advantages of this method include a large saving in energy, and a much greater measure of thermal control, since the heat changes in the reactions are small. As the initial product is amorphous and may be of tiny particle size, the heating can cause some particle growth and ordering, to give a material of optimum sub-division and degree of crystallinity for efficient cathode preparation, especially for thin-film electrodes. To obtain material of a sufficiently high specific surface area and of sufficient disorder for good cathode power density and kinetic reversibility is difficult by the known high-temperature direct synthesis.

It has been found that the reaction in solution of various divalent metal ions $M^{2+}$ with hexathiohypophosphate anion $(P_2S_6)^{4-}$ leads to amorphous, and in some cases colloidal, products with the empirical formula $M^{II}PS_3$. The reaction may be expressed stoichiometrically thus:

$$2M^{2+} + (P_2S_6)^{4-} = 2M^{II}PS_3 \quad \text{Equation (1)},$$

although it should be understood that the final products are polymeric, and not in simple molecular form as depicted.

M is preferably a transition metal (i.e. of atomic number 22-30, 40-48 or 72-80), preferably of atomic number 22-30, such as Fe, Co or Ni.

The reaction between the above ions may be at 0° to 100° C., such as room temperature or slightly above.

The solution of $M^{2+}$ cation optionally originates by contact of a solution of another cation (such solution possibly also being the said source of hexathiohypophosphate anion) with an $M^{2+}$-cation-exchange resin.

The $M^{II}PS_3$ formed may be removed from the solution and washed, and the washing liquid and any residual solvent are removed, before the heating. The heating may be for from 2 to 4 hours (e.g. substantially 3 hours), and at a temperature of from 300° to 450° C., preferably 320° to 400° C., such as substantially 350° C.

After removal of the solvent and some heating, some of the compounds (for example $NiPS_3$) will function as a cathode material in lithium-organic electrolyte cells. Thus, a method of making a cathode for an alkali-metal rechargeable cell comprises applying a compound prepared as set forth above, mixed with a vehicle or a polymeric binder and with an electronically conductive powder, onto a metallic electrode support.

The invention extends to the compounds so prepared, and to the cathodes so made, and to an alkali-metal (e.g. lithium) rechargeable cell comprising such a cathode.

On prolonged strong heating, in excess of that according to the invention, the compounds become indistinguishable from the product of the known high-temperature direct synthesis. Some of the latter are already known to be cathode-active in secondary lithium cells because their layered crystal structures permit reversible insertion reactions with lithium ions. However, milder heating of the products of equation (1) gives partial annealing and leads to a favourable combination of crystalline order and high surface area, which for some $M^{II}PS_3$ compounds produces a cathode material with improved capacity and reversibility under maximum current conditions.

The invention will now be described by way of example. The source of hexathiohypophosphate ions used in the following Examples is an alkali-metal hexathiohypophosphate, e.g. $Na_4P_2S_6$, $Li_4P_2S_6$ or $K_4P_2S_6$, and since these materials are not widely obtainable, brief details of their preparation are given as "Example 0", which does not form any part of this invention.

EXAMPLE 0

The principle of their preparation was discovered by H. Falius (*Z. Anorg. Allg. Chem.* 356, 189 (1968)) and an extension of his work is briefly given here.

The compounds $Na_4P_2S_6$, $K_4P_2S_6$ and $Li_4P_2S_6$ are made by reacting a saturated solution of $Na_2S$, $K_2S$ or $Li_2S$ in water (or in a polar aprotic solvent) with one-quarter to one-third of its molar quantity of phosphorus trichloride $PCl_3$. The $PCl_3$ is added to a cooled solution of the alkali sulphide, stirred by the rapid passage of air through it, the rate of addition being such that the temperature does not rise above 25° C. Air bubbling is continued for a further 2 hours:

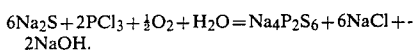

$$6Na_2S + 2PCl_3 + \tfrac{1}{2}O_2 + H_2O = Na_4P_2S_6 + 6NaCl + 2NaOH.$$

In the case of the sodium salt, separation of the required solid occurs on cooling to around 0° C. It is fairly pure, but may be recrystallised from a small quantity of hot water.

The potassium and lithium salts may be separated from the corresponding chlorides, formed analogously to the sodium compounds, by addition of about 50% by volume of ethanol, which precipitates the required compounds, leaving the chlorides in solution.

The $M^{II}PS_3$ compounds are all made according to the invention as shown in equation (1) above, but the technique most applicable depends on the properties of the product:

METHOD A: for insoluble metal phosphorus trisulphides.

A solution of a salt of the divalent metal M, either in water or a polar non-aqueous solvent, is added to a solution of the alkali hexathiohypophosphate or to a slurry of the latter with the same solvent if the solubility is low. The resulting precipitate is digested for an hour under reflux of the solvent, then filtered off and washed with pure solvent to remove the concomitant alkali metal salts. In the case of sodium salts (particularly the halides) water is the most efficient solvent for this purpose, although organic solvents of high dielectric constant (such as methylformamide) may be used if the desired product is readily hydrolysed by water. For preparations using halide salts and lithium or potassium hexathiohypophosphate, the washing may be done with water, or with a low molecular-weight aliphatic alcohol, ketone, ether or ester. Methanol, ethanol, acetone, tetrahydrofuran or ethyl acetate may be used conveniently if water is unsuitable.

The product is air-dried on a pumped filter after washing, and finally freed from solvent or other volatile matter by heating in vacuo at 100° to 200° C. for several hours.

Method A may be illustrated by two synthesis examples:

SYNTHESIS EXAMPLE 1

(For products such as $ZnPS_3$ which are not rapidly hydrolysed by water (except at low pH), or oxidised by air)

To a saturated aqueous solution of hydrated sodium hexathiohypophosphate, $Na_4P_2S_6.6H_2O$ (10.0 g), was added, with stirring, a solution containing about 95% of the stoichiometric quantity of zinc chloride, $ZnCl_2$ (2.85 g) in 25 cm$^3$ of water, all at room temperature. After digestion for about 1 hour on a steam-bath, the resulting precipitate was filtered under gentle suction, washed with water and then acetone and sucked dry on the filter. It was then freed from remaining solvent by heating to 200° C. under vacuum.

SYNTHESIS EXAMPLE 2

(For products such as $FePS_3$ which are rather easily hydrolysed and also become oxidised by air when newly-formed in a fine state of sub-division)

A solution of anhydrous iron(II) bromide (6.3 g) in methanol (30 cm$^3$) was purged with oxygen-free nitrogen and added to a nitrogen-purged slurry of powdered anhydrous $Na_4P_2S_6$ (5.0 g) in methanol. (All handling was done in an inert-atmosphere glove-box.)

A magnetic stirrer-hotplate was used to agitate the mixture and to maintain it at 50° C. under reflux for 2 hours. When the mixture was cooled below 30° C. the dark amorphous $FePS_3$ could be filtered quite easily with a Buchner funnel and filter pump. Washing with methanol quickly removed most of the sodium salt, although its complete elimination required prolonged leaching in a Soxhlet extractor with refluxing methanol. The product was dried under vacuum.

The amorphous compounds prepared by Method A may be annealed and tested as cathode materials as described in the next section.

METHOD B: (For metal phosphorus trisulphides such as $NiPS_3$ and $CoPS_3$, which may be produced as colloidal solutions by reaction according to equation (1)).

In these cases, the divalent metal ion may be supplied by a cation-exchange resin, to give a colloid free from ionic impurities. From this, the desired product may be extracted by vacuum evaporation, or more conveniently by the addition of a miscible solvent of low dielectric constant to precipitate it in amorphous form. At this stage, the precipitate is buky and gelatinous; it may then be digested, filtered and annealed to the required degree of crystallinity for use as a cathode material (Rechargeable Cell Example 1). Alternatively, the gelatinous product may be applied directly to an inert metal conductor and dried to form a thin-layer electrode (Rechargeable Cell Example 2). For higher-current applications, it is preferable to mix the gel with small proportions of conducting additive such as acetylene black, and of a soluble polymeric binder, before application to the electrode surface, as in Rechargeable Cell Examples 2 and 3.

SYNTHESIS EXAMPLE 3

A 2 cm-wide ion-exchange column was packed to a depth of about 20 cm with a granular cation-exchange resin in the sodium form. A solution of nickel(II) chloride hexahydrate (20 g) in water (200 cm$^3$) was allowed to percolate through the resin at a rate of 10 cm$^3$ per minute, thereby converting the latter to the nickel form. About 100 cm$^3$ of water were passed slowly through the column to remove the excess nickel, sodium and chloride ions; the absence of the nickel was verified by the lack of a pink colour on adding dimethyglyoxime to a small portion of the eluate. A saturated solution of $Na_4P_2S_6.6H_2O$ (10 g) in water was then allowed to flow through the ion-exchanger at 5 cm$^3$ per minute, and a deep red colloidal solution of $NiPS_3$ was soon observed to flow from the column. When the sodium salt solution level had fallen to the top of the column, a further 30 cm$^3$ of water were added and passed through the resin column to wash out most of the product. To the eluate was added an equal volume of propan-2-ol or methyl acetate, which precipitated the $NiPS_3$ in amorphous form. (The product was more easily filtered if left to stand for an hour or two at 25° C., or if heated under reflux on a water-bath for 10 minutes.) Filtration with a Buchner funnel under vacuum completely separated the amorphous $NiPS_3$ from the mixed solvent. Washing was unnecessary, although air-drying under suction was hastened when a little acetone was used to rinse the solid. The $NiPS_3$ was freed from solvent by heating under vacuum at 150° C.

SYNTHESIS EXAMPLE 4

A colloidal solution of $CoPS_3$ was made following the procedure of Example 3 but using cobalt(II) chloride instead of nickel(II) chloride, and using an inert atmosphere as $CoPS_3$ is less stable in moist air.

The products of the Synthesis Examples 1 to 4 were X-ray amorphous.

On standing at room temperature for some weeks, amorphous $NiPS_3$ showed a weak, diffuse 001 reflection. Amorphous $PbPS_3$ and $FePS_3$ were rapidly decomposed in the presence of moist air; $ZnPS_3$, $CdPS_3$ and $CoPS_3$ were somewhat less sensitive, while $NiPS_3$ alone could be prepared on the open bench without difficulty. However, because of its fine state of sub-division, even this compound underwent slow reaction with water and oxygen. It also had a high affinity for last traces of polar solvents, and even appeared to take up some $NH_3$ gas, which has no reaction with crystalline $NiPS_3$. Samples of amorphous $NiPS_3$ were dried under high vacuum in small silica ampoules, which were then sealed and placed in an oven for 3 hours at various temperatures. Study of the annealed samples by X-ray powder diffraction showed a gradual appearance and sharpening of lines characteristic of crystalline $NiPS_3$.

specimen has the best reversibility; this is obtained after partial annealing at about 350° C.

TABLE

| Anneal temperature (°C.) of amorphous $NiPS_3$ (all for 3 hours) | Moles Li inserted[a] | Moles Li extracted[b] | Open-circuit cell voltage (after 3 hours discharge current 10 microamp per cm²) $Li_{0.7}NiPS_3$ (Anode Li/Li+) | Cell voltage on load (10 micro-amp per cm²) $Li_{0.7}NiPS_3$ vs Li/Li+ | Particle size (Å) XRD | SEM |
|---|---|---|---|---|---|---|
| unannealed | 2 | 0.3 | — | — | <50[c] | — |
| 272 | 2 | 0.8 | 2.65 | 1.8 | ~80 | — |
| 350 | 1.9 | 1.6 | 2.90 | 2.8 | 200 | ~500 |
| 430 | — | — | 2.90 | 2.6 | — | — |
| 500 | 1.8 | 1.2 | 2.85 | 2.5 | 800 | 1200 |
| 560 (7 days) | 1.6 | 1.0 | 2.75 | 2.0 | ? | >$10^5$ |

[a]Li intercalated chemically by means of n-butyl-lithium
[b]Determined by means of iodine in acetonitrile
[c]Indicated value in colloid about 25Å
XRD = X-ray diffraction
SEM = Scanning electron microscope The most characteristic stages of this may be described briefly thus:

(a) The unannealed product has the appearance of smooth flakes of dried mud, rendered somewhat "spongy" by the emergence of remaining solvent on vacuum drying.

(b) The sample annealed at 350° C. is the first to show any microstructural changes in the electron microscope, although the X-ray linewidths show some increase in ordering distances at lower temperatures. Small, irregular "granules" appear, and the surface gives an impression of increased porosity.

(c) The 500° C. sample has well-developed wreath-like formations of crystallites, though the characteristic hexagonal crystal shape is not markedly distinguishable in most of them.

(d) After prolonged heating at 560° C., the surfaces of the amorphous $NiPS_3$ flakes are completely covered by beautifully formed hexagonal platelets. The fact that these are so well separated and symmetrical is an indication that sublimation has played a major role here: although the normal vapour-transport temperature is 160° C. higher, thermogravimetric analysis shows that $NiPS_3$ is appreciably volatile at 560° C.

Each of the above samples were tested for reversible uptake of lithium as follows:

A known weight of sample was reacted with 2.0 equivalents of n-butyl-lithium (0.1M in hexane) in the dry-box for 2 days. The amount of lithium taken up was determined by back-titrating the unused base in the filtered solution after hydrolysis. The solid products were washed and dried, and then chemically de-lithiated by reaction with excess iodine in $CH_3CN$; the filtered extract was analysed for lithium by flame photometry.

The results are summarised in the Table. Clearly, neither the amorphous nor the strongly-crystalline Therefore, for battery purposes the product $NiPS_3$ from Example 3 was annealed under inert gas at temperatures between 150° and 500° C. (preferably 300° to 450° C.) for a period of 1-6 hours preferably 2-4 hours. The samples annealed for 3 hours at 350° C. produced a product of sufficient crystallinity to give X-ray confirmation of identity and to give a good performance in a lithium cell.

RECHARGEABLE CELL EXAMPLE 1

A sample of the $NiPS_3$ from Synthesis Example 3 annealed for 3 hours at 350° C. was mixed in a mortar with 10% of its weight of acetylene black and 5% of polytetrafluoroethylene powder, and in a conventional procedure the mixture was pressed onto a piece of stainless steel grid to form a cathode. The active material was present in a surface concentration of 10 mg per cm². A cell was assembled in a dry-box, comprising the cathode, a lithium foil anode and a 1M solution of lithium perchlorate in propylene carbonate, this solution being soaked into a glass-fibre separator between the electrodes. The cell was held together under compression by spring-loaded current collectors. At 2 mA per cm², it was found possible to cycle this cell repeatedly between 1.8 volts and 2.6 volts with a capacity of 2 moles per mole of $NiPS_3$.

RECHARGEABLE CELL EXAMPLE 2

A suspension (colloid) of $NiPS_3$ was made using the method of Synthesis Example 3, and to this aqueous colloid about half its volume of ethylene glycol was added as a vehicle. An amount of fine acetylene black equivalent to 5% of the $NiPS_3$ content (by weight) was mixed with the suspension. A piece of nickel foil was etched by immersing it in concentrated hydrochloric acid for 30 seconds, rinsed in water and dried. Some of the mixture was painted onto the foil, which was then freed from solvents by drying in a vacuum oven for 6 hours at 200° C. During this time a favourable partial annealing of the $NiPS_3$ took place, leading to good, reversible cathode behaviour. The foil had a coating of 3 mg of $NiPS_3$ per cm², present in a quite coherent glassy film which only became granular and flaky after stronger annealing in situ. Hence no polymeric binder was necessary in this case.

RECHARGEABLE CELL EXAMPLE 3

A rechargeable cell was made, using the NiPS$_3$ from Synthesis Example 3 annealed in inert gas for 3 hours at 350° C., except when other annealing temperatures were used as shown in the Table. As an experiment to enhance the conductivity of the cathode, instead of graphite we used silver powder of six nines purity and particle size under 45 microns.

Conventional polymeric binders can be used for the cathode, such as poly(vinylidene fluoride), poly(vinyl chloride), polytetrafluoroethylene and polystyrene. In this Rechargeable Cell Example, we used polystyrene because (somewhat surprisingly in view of its low reported dielectric constant) it was wetted by LiClO$_4$ solution in propylene carbonate and gave good binding at low concentration. Poly(vinyl chloride) was not preferred since it appeared to be more reactive than was the polystyrene to lithium.

Sixty-five parts by weight of NiPS$_3$, 8 parts of polystyrene and 27 parts of silver were mixed with sufficient cyclohexanone to produce a paint-like consistency on stirring. This solvent had the required wetting and solubilising properties, together with sufficient viscosity to maintain homogeneity, and a moderate volatility.

A cathode-collector of nickel foil, about 10 cm$^2$ in area, was cleaned with dichloromethane, etched in concentrated HCl, washed, dried and weighed. The "paint" was then applied, using a fine camel-hair brush, and was allowed to air-dry. After an hour in a vacuum oven at 50° C., it was allowed to cool and re-weighed to allow estimation of the amount of active material on the cathode.

Before cell assembly, however, the foil was warmed for 1 hour under high vacuum ($10^{-5}$ torr) in a test-tube fitted with a stopcock. This was transferred into the dry-box and only opened when the cathode was to be positioned in the cell.

For the anode, freshly-scraped lithium foil was pressed onto an anode collector made of nickel foil, and this was held in position in the cell body, which was closed and sealed when the electrolyte had been inserted (1M LiClO$_4$ in propylene carbonate, 7 cm$^3$).

The cell performance was as in the Table. An annealing temperature for the NiPS$_3$ of 350° C. was found to give better kinetic reversibility for the cell than did 150° C. or 560° C.

An identical cell made up with amorphous CdPS$_3$ polarised very easily. (This compound also exhibited no reaction with n-butyllithium.)

We claim:

1. A method of preparing a compound of the empirical formula: M$^{II}$PS$_3$, where M is a metal, comprising:
   bringing together a source of hexathiohypophosphate anion and a solution of M$^{2+}$ cation, whereby the compound M$^{II}$PS$_3$ is formed; and
   heating the compound in a non-reactive environment for 10 to 6 hours at 150° to 500° C.

2. The method according to claim 1, wherein M is of atomic number 22-30, 40-48 or 72-80.

3. The method according to claim 2, wherein M is of atomic number 22-30.

4. The method according to claim 3, wherein M is Ni or Fe or Co.

5. The method according to claim, 1, 2, 3 or 4 wherein the solution of M$^{2+}$ cation originates by contact of a solution of another cation with an M$^{2+}$-cation-exchange resin.

6. The method according to claim 5, wherein said solution of another cation is also the source of hexathiohypophosphate anion.

7. The method according to claim 1, further comprising: removing the compound M$^{II}$PS$_3$ before it is heated, and washing it, and removing the washing liquid and any residual solvent from the washed compound before it is heated.

8. The method according to claim 1, wherein the source of anion and the solution of cation are brought together at from 0° to 100° C.

9. The method according to claim 1, wherein the compound is heated for 2-4 hours.

10. The method according to claim 1, wherein the compound is heated at 300°-400° C.

11. The method according to claim 10, wherein the compound is heated at 320°-400° C.

* * * * *